B. FORD.
STORAGE BATTERY CELL.
APPLICATION FILED MAR. 14, 1911.

1,111,451.                                          Patented Sept. 22, 1914.

WITNESSES:

INVENTOR
Bruce Ford
BY
ATTORNEY.

UNITED STATES PATENT OFFICE.

BRUCE FORD, OF PHILADELPHIA, PENNSYLVANIA.

STORAGE-BATTERY CELL.

1,111,451.     Specification of Letters Patent.     Patented Sept. 22, 1914.

Application filed March 14, 1911. Serial No. 614,425.

*To all whom it may concern:*

Be it known that I, BRUCE FORD, a citizen of the United States, residing at the city of Philadelphia, in the county of Philadelphia and State of Pennsylvania, have invented certain new and useful Improvements in Storage-Battery Cells, of which the following is a specification.

The principal object of the present invention is to provide a tell-tale or means for showing or indicating when the cell has been filled with fluid to a predetermined level.

Another object of the invention is to provide for opposing leakage by reason of splash or spray through the filling opening.

The invention will be claimed at the end hereof but will first be described in connection with the embodiments of it chosen for illustration in the accompanying drawings in which—

Figure 1:
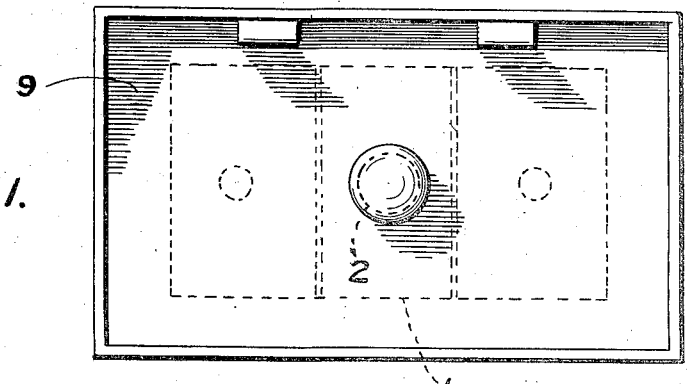
Figure 2:
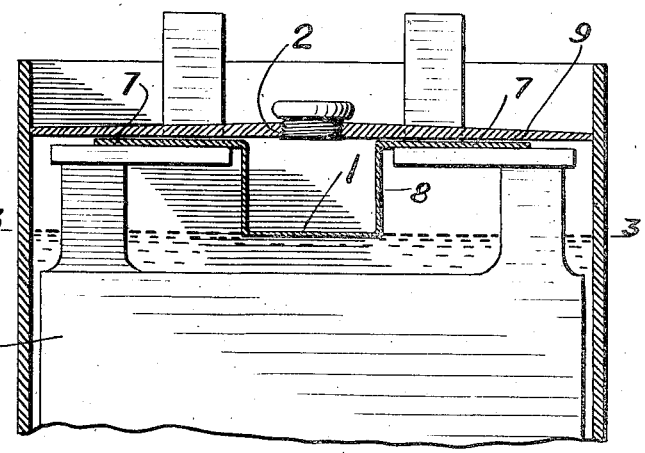
Figures 3, 4, 5:
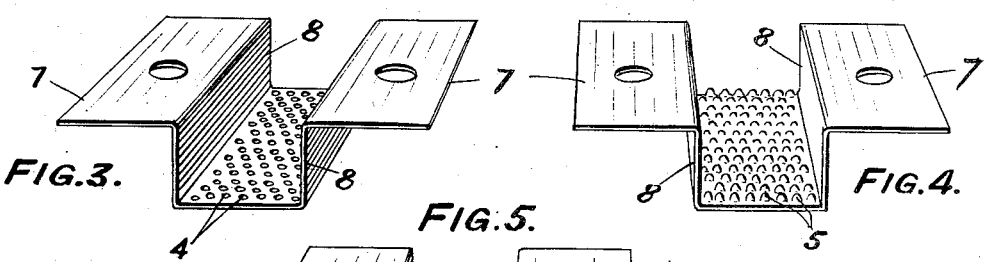

Figure 1, is a top or plan view of a storage battery cell embodying features of the invention. Fig. 2, is a transverse sectional view of the upper part of the cell, and Figs. 3, 4 and 5, are perspective views of channel members embodying modifications of the invention and detached from the cover of the cell.

In the drawings 1, is a tell-tale surface arranged opposite the filling opening 2, and contrasted with the surface of the fluid in the cell, which surface is indicated by the dotted line 3—3. The tell-tale surface may be contrasted with the fluid surface by roughening or interrupting it and it may be so roughened by providing it with perforations 4, as shown in Fig. 3, or with projections 5, as shown in Fig. 4, or with ribs or corrugations 6, as shown in Fig. 5. The object is to provide a surface which will show when the level of the fluid reaches it and this surface may therefore be considerably modified while still accomplishing that purpose. The channel member of which the surface 1, is the web portion also comprises arm portions 7, and side portions 8, by means of which the web portion 1, is spaced away from the arm portions 7. The arm portions 7. are applied to the under side of the cover 9, and the channel member may range crosswise of the cover and of the plates 10, so that its open ends are disposed toward the longer sides of the cell. The channel member not only presents the tell-tale or distinguishing surface in proper position opposite the filling opening but it also opposes splashing and spraying toward that opening and thus opposes leakage.

What I claim is:

1. In a storage battery cell the combination of a cover having a filling opening and a channel member applied to the cover with its web portion spaced from the cover and arranged opposite the opening to operate as a tell-tale in filling the cells.

2. In a storage battery cell the combination of a cover having a filling opening and a channel member applied to the cover with its web portion roughened and spaced from the cover and arranged opposite the opening to operate as a tell-tale in filling the cell.

3. In a storage battery cell the combination of a cover having a filling opening and a channel member applied to the cover with its web portion perforated and spaced from the cover and arranged opposite the opening to operate as a tell-tale in filling the cell.

4. In a storage battery cell the combination of a cover having a filling opening and a channel member having its arm portions applied to the cover and its web portion spaced from and arranged opposite the opening, substantially as described.

5. In a storage battery cell the combination of a cover having a filling opening and a channel member having its arm portions applied to the cover and its web portion spaced from and arranged opposite the opening and its open ends disposed toward the longer sides of the cell, substantially as described.

6. In a storage battery cell, the combination of the plates thereof, the electrolyte, and a telltale or distinguishing surface maintained in a fixed position above the plates as a gage for fixing the level of the electrolyte in filling the cell.

In testimony whereof I have hereunto signed my name.

BRUCE FORD.

Witnesses:
J. WESLEY SEEGER,
F. H. KNORR.